US011609849B2

(12) United States Patent
Butt et al.

(10) Patent No.: US 11,609,849 B2
(45) Date of Patent: Mar. 21, 2023

(54) DEDUPLICATION SYSTEM THRESHOLD BASED ON A TYPE OF STORAGE DEVICE

(71) Applicants: John Butt, Weston-super-Mare (GB); Dave Donaghy, Bath (GB); Mayuri Jain, Bristol (GB); Alastair Slater, Chepstow (GB)

(72) Inventors: John Butt, Weston-super-Mare (GB); Dave Donaghy, Bath (GB); Mayuri Jain, Bristol (GB); Alastair Slater, Chepstow (GB)

(73) Assignee: Hewlett Packard Enterprise Development LP, Spring, TX (US)

(*) Notice: Subject to any disclaimer, the term of this patent is extended or adjusted under 35 U.S.C. 154(b) by 55 days.

(21) Appl. No.: 17/245,813

(22) Filed: Apr. 30, 2021

(65) Prior Publication Data

US 2021/0255953 A1    Aug. 19, 2021

Related U.S. Application Data

(62) Division of application No. 16/773,710, filed on Jan. 27, 2020, now Pat. No. 11,106,580.

(51) Int. Cl.
*G06F 12/02* (2006.01)
*G06F 16/215* (2019.01)

(52) U.S. Cl.
CPC ...... *G06F 12/0253* (2013.01); *G06F 12/0246* (2013.01); *G06F 16/215* (2019.01); *G06F 2212/1032* (2013.01); *G06F 2212/1044* (2013.01)

(58) Field of Classification Search
CPC ............ G06F 12/0253; G06F 12/0246; G06F 16/215; G06F 2212/1032; G06F 2212/1044; G06F 16/1748; G06F 3/0641; G06F 11/1453
See application file for complete search history.

(56) References Cited

U.S. PATENT DOCUMENTS

| 7,467,274 | B2 | 12/2008 | Neufeld et al. |
| 8,099,573 | B2 | 1/2012 | Camble et al. |
| 8,285,918 | B2 | 10/2012 | Maheshwari |
| 8,332,404 | B2 | 12/2012 | Camble et al. |

(Continued)

FOREIGN PATENT DOCUMENTS

| CN | 102982122 A | 3/2013 |
| CN | 105917304 A | 8/2016 |

(Continued)

OTHER PUBLICATIONS

Arany Péter et al., SSD Wear_Leveling_Count = 17,' available online at <https://serverfault.com/questions/901435/ssd-wear-leveling-count-17>, retrieved on Jan. 7, 2020, 2 pages.

(Continued)

*Primary Examiner* — Masud K Khan
*Assistant Examiner* — Dustin B. Fulford
(74) *Attorney, Agent, or Firm* — Hewlett Packard Enterprise Patent Department

(57) ABSTRACT

Examples may include a deduplication system threshold based on an amount of wear of a storage device. Examples may obtain an indication of an amount of wear experienced by at least one storage device storing a plurality of container indexes of a deduplication system, and may adjust a threshold of the deduplication system based on the amount of wear.

20 Claims, 5 Drawing Sheets

(56) References Cited

U.S. PATENT DOCUMENTS

| | | |
|---|---|---|
| 8,566,519 B2 | 10/2013 | Lay et al. |
| 8,799,238 B2 | 8/2014 | Eshghi et al. |
| 8,959,089 B2 | 2/2015 | Lillibridge et al. |
| 9,372,941 B2 | 6/2016 | Jones et al. |
| 9,390,116 B1 | 7/2016 | Li et al. |
| 9,413,527 B2 | 8/2016 | Yang et al. |
| 9,513,822 B2 | 12/2016 | Nazari et al. |
| 9,684,569 B2 | 6/2017 | Dolan et al. |
| 9,785,666 B2 | 10/2017 | Li et al. |
| 9,940,234 B2 | 4/2018 | Davis |
| 10,235,396 B2 | 3/2019 | Ioannou et al. |
| 10,365,974 B2 | 7/2019 | Todd et al. |
| 2009/0112945 A1 | 4/2009 | Camble et al. |
| 2010/0235372 A1 | 9/2010 | Camble et al. |
| 2012/0137097 A1 | 5/2012 | Slater et al. |
| 2012/0143715 A1 | 6/2012 | Eshghi et al. |
| 2014/0281361 A1 | 9/2014 | Park et al. |
| 2014/0325147 A1 | 10/2014 | Nayak |
| 2015/0088840 A1 | 3/2015 | Eshghi et al. |
| 2016/0266820 A1 | 9/2016 | Barajas Gonzalez et al. |
| 2019/0121705 A1 | 4/2019 | Mayo et al. |

FOREIGN PATENT DOCUMENTS

| | | |
|---|---|---|
| DE | 112016000176 T5 | 8/2017 |
| DE | 112017002941 T5 | 3/2019 |
| WO | 2011/030290 A1 | 3/2011 |
| WO | WO-2016091282 | 6/2016 |

OTHER PUBLICATIONS

Chang et al., "Real-time garbage collection for flash-memory storage systems of real-time embedded systems," ACM Transactions on Embedded Computing Systems (TECS), Nov. 2004, vol. 3, No. 4, pp. 837-863.

Debnath et al., "ChunkStash: Speeding up Inline Storage Deduplication using Flash Memory", Jun. 2010, pp. 1-16.

Gal et al., "Algorithms and Data Structures for Flash Memories", ACM Computing Survey, Jun. 2005, vol. 37, No. 2, pp. 138-163.

Lillibridge et al., "Sparse Indexing: Large Scale, Inline Deduplication Using Sampling and Locality," 7th USENIX Conference on File and Storage Technologies, Jan. 1, 2009, pp. 111-123.

Marty et al., "How Do I interpret HDD S.M.A.R.T Results?," Ask Ubuntu, available online at <https://askubuntu.com/questions/20393/how-do-i-interpret-hdd-s-m-a-r-t-results>, retrieved on Jan. 7, 2020, 5 pages.

Nick et al., "Samsung SSD 'Wear_Leveling_Count' meaning", available online at <https://superuser.com/questions/1037644/samsung-ssd-wear-leveling-count-meaning>, retrieved on Jan. 7, 2020, 3 pages.

Wikipedia, "S.M.A.R.T", available online at <https://en.wikipedia.org/w/index.php?title=S.M.A.R.T.&oldid=937407361>, Jan. 24, 2020, pp. 1-20.

DEDUPLICATION SYSTEM THRESHOLD BASED ON A TYPE OF STORAGE DEVICE

CROSS-REFERENCE TO RELATED APPLICATIONS

This application is a divisional application of and claims priority to application Ser. No. 16/773,710, filed on Jan. 27, 2020, the contents of which are hereby incorporated by reference in their entireties.

BACKGROUND

A client computing device, such as a host server or the like, may store data in a primary storage array, and may execute workloads against the data stored in the primary storage array. In some examples, for purposes such as redundancy and data protection, the data stored in the primary storage array may be backed up in a backup appliance separate from both the client computing device and the primary storage array. In some examples, the backup appliance may store data in a deduplicated form such that the data is stored more compactly than on the primary storage array, for example.

BRIEF DESCRIPTION OF THE DRAWINGS

The following detailed description references the drawings, wherein.

DETAILED DESCRIPTION

As noted above, a computing device (such as a host, server, storage array, etc.) may back up data by storing the data in a computing system able to perform deduplication on the data (referred to herein as a "deduplication system") in order to store the data in a deduplicated form that is more compact than a non-deduplicated form. In examples described herein, a process of deduplication may be performed by a deduplication system on a collection of data (referred to herein as a "stream" of data or a "data stream").

Figure 1:
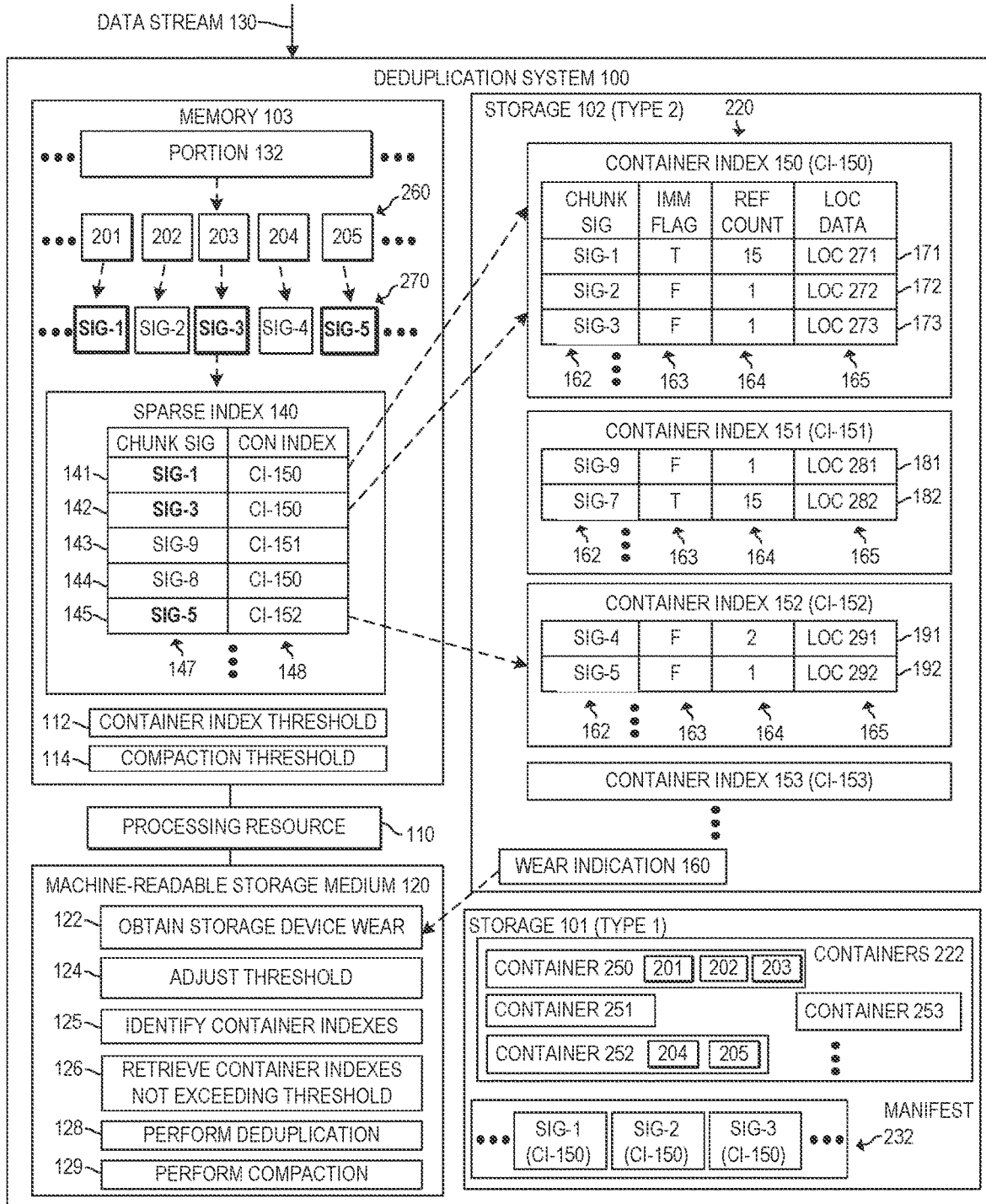
FIG. 1 is a block diagram of an example deduplication system to adjust a threshold based on an amount of storage device wear.

FIG. 1 is a block diagram of an example deduplication system 100 to adjust a threshold based on an amount of storage device wear, in accordance with examples described herein. In the example illustrated in FIG. 1, deduplication system 100 may be implemented by a computing device (such as at least one storage array, backup appliance, or the like) comprising at least one processing resource 110 and at least one machine-readable storage medium 120 comprising (e.g., encoded with) at least storage instructions 122, 124, 125, 126, 128, and 129 that are executable by the at least one processing resource 110 of deduplication system 100 to implement functionalities described herein in relation to instructions 122, 124, 125, 126, 128, and 129.

An example process of deduplication is described below in relation to the example of FIG. 1, in which deduplication system 100 comprises at least one processing resource 110 and at least one machine-readable storage medium 120 storing instructions executable by the at least one processing resource 110 to perform the functionalities described herein in relation to deduplication system 100. Deduplication system 100 may store deduplicated representations of one or more streams of data using data structures including containers, container indexes, and manifests (which may also be referred to as "portion indexes"). Examples of these data structures will be described below in relation to an example data deduplication process of deduplication system 100. In some examples, these data structures may be part of a "deduplication domain" (which may also be referred to herein as a "deduplication store"), which may represent a particular collection of data against which data deduplication may be performed by a deduplication system. For example, instructions of deduplication system 100 may perform deduplication for a given data stream (e.g., 130) against the contents (e.g., containers, container indexes, etc.) of a particular deduplication domain. In some examples, deduplication system 100 may comprise a plurality of different deduplication domains. In the examples described herein, all functionalities described as performed by a deduplication system (e.g., deduplication system 100) may be performed by instructions stored on machine-readable storage medium of the deduplication system 100 and executed by at least one processing resource of the deduplication system.

In some examples, deduplication system 100 may receive a data stream 130 to store in a deduplicated form. A data stream may correspond to user object(s) (e.g., file(s), a file system, volume(s), or any other suitable collection of data). The instructions of deduplication system 100 may divide the stream 130 into a plurality of portions, and perform aspects of the deduplication process (e.g., matching, etc.) on the stream 130 a portion at a time. As used herein, where a "portion" is a contiguous subset of a data stream. For example, instructions 128 may divide out a portion 132 of stream 130 for processing. In such examples, instructions 128 may divide portion 132 into fixed or variable length sections referred to herein as "chunks", identify "duplicate" chunks having content identical to that of other chunk(s), store one (full or compressed) copy of each chunk not identified as being a duplicate of an already-stored chunk, and, for each duplicate chunk, store a reference (e.g., a pointer) to a stored copy of the chunk without storing the duplicate chunk again. In this manner, a deduplication process may often avoid storing duplicates of the same chunk in a deduplication system. In such examples, the deduplication system may store a deduplicated representation of a data stream, the deduplicated representation comprising selected data chunks and sufficient metadata to reconstruct the full version of a data stream from the selected data chunks and the metadata.

For example, instructions 128 may divide portion 132 into a plurality of chunks 260 (including chunks 201-205, for example), and then determine respective chunk signatures 270 (including chunk signatures SIG-1-SIG-5, for example) for each of chunks 260. Although, for simplicity of explanation, FIG. 1 shows five chunks 260 of portion 132 and five respective chunk signatures 270, instructions 128 may divide portion 132 into any suitable number of chunks (e.g., based on the overall size of portion 132), and determine a corresponding number of chunk signatures (i.e., one for each chunk). In examples described herein, a "chunk signature" may be data representative of the content of a chunk derived by applying a signature function to the chunk. In some examples, the signature function may be a hash function, and the chunk signature may be a hash (or hash value) of the chunk generated by applying the hash function on the chunk. Any suitable hash function may be used to generate the chunk signature. In other examples, any other suitable type of signature function may be used in place of a hash function to generate an appropriate chunk signature (e.g., a function to generate a suitable type of fingerprint).

In some examples, a data stream, such as data stream 130, may be subdivided into portions, and deduplication system 100 may perform deduplication on one portion of the data stream at a time. In the example of FIG. 1, one such portion is portion 132, which deduplication system 100 may receive as part of data stream 130. For each portion of the data stream, deduplication system 100 may divide the portion into respective chunks of either a fixed size (e.g., approximately 4K) or a variable size and then, for each chunk, apply an appropriate signature function to the content of the chunk to obtain a chunk signature for the chunk.

For example, for portion 132 of FIG. 1, deduplication system 100 may divide portion 132 into chunks 260 (e.g., chunks 201-205, etc.), that together make up all the data of portion 132. For each chunk of chunks 260, deduplication system 100 apply a signature function (e.g., a hash function) to the content of each chunk to obtain respective chunk signatures 270 (e.g., a hash values) for each chunk. For example, deduplication system 100 may apply the signature function to chunk 201 to obtain a chunk signature "SIG-1", to chunk 202 to obtain a chunk signature "SIG-2", to chunk 203 to obtain a chunk signature "SIG-3", to chunk 204 to obtain a chunk signature "SIG-4", to chunk 205 to obtain a chunk signature "SIG-5", and the like for each of chunks 260.

For each of chunks 260 of portion 132, instructions 128 may store the chunk signature derived from the chunk in a manifest 232 of deduplication system 100, such that manifest 232 includes a respective chunk signature for each of the chunks of portion 132, with the respective chunk signatures stored in the manifest 232 in the same order as the chunks themselves occur in portion 132. In such examples, manifest 232 may store respective chunk signatures for each chunk of each portion of data stream 130. With each chunk signature stored in a manifest, instructions 128 may store an identifier of a container index having an entry for that chunk signature, which also includes location data for where the corresponding chunk is stored in a container corresponding to the chunk index (e.g., for use in reconstructing the original data stream). For example, in the example of FIG. 1, manifest 232 includes, among other things, chunk signatures SIG-1, SIG-2, and SIG-3, each with identifier "CI-150" for container index 150. Also, for each of chunks 260 of portion 132, instructions 128 may use the chunk signature for the chunk to determine whether an identical chunk has already been stored in a container of deduplication system 100 (i.e., whether the chunk is a duplicate of an already stored chunk).

In examples described herein, a container may be a logical entity (e.g., a file, etc.) in which chunks of data may be stored (e.g., in a full or compressed form). In the example of FIG. 1, deduplication system 100 comprises a plurality of containers 222, including containers 250-253, for example, each of which comprises one or more of chunks of data. For example, in the example illustrated in FIG. 1, container 250 comprises chunks 201-203 (i.e., chunks equivalent to chunks 201-203 of portion 132, respectively), among other chunks, and container 252 comprises chunks 204 and 205 (i.e., chunks equivalent to chunks 204 and 205 of portion 132, respectively) among others.

In the example of FIG. 1, each of containers 222 may have a corresponding container index of container indexes 220 of deduplication system 100. In examples described herein, a given "container index" may be an index of the chunks contained in a given container to which the given container index corresponds. For example, deduplication system 100 may comprise a container index 150 corresponding to container 250, a container index 151 corresponding to container 251, a container index 152 corresponding to container 252, a container index 153 corresponding to container 253, etc. Although, for simplicity of explanation, FIG. 1 shows four containers 222 and four corresponding container indexes 220, deduplication system 100 may include any suitable number of containers 222 and corresponding container indexes 220.

In examples described herein, each of container indexes 220 comprises one or more entries, with each container index including an entry for each chunk in the corresponding container. An entry for a given chunk may include the chunk signature 162 determined for the given chunk, location data 165 specifying a location of the given chunk in the corresponding container (e.g., via an offset into the container and a length, or the like), and a reference count 164 to indicate how many references to the chunk signature of the entry are made by various manifests of a deduplication domain (e.g., deduplication store) of the deduplication system 100. In some examples, each entry may also include an immutable flag 163, as described below in relation to FIG. 4. In some examples, entries of a container index may include other information (e.g., a compression technique used, etc.) instead of the described information, in addition to it, or any combination thereof.

For example, container index 150 includes an entry 171 including data for a respective chunk 201 in corresponding container 250, including, for chunk 201, a chunk signature SIG-1, a reference count of 15, and location data 271 indicating a location in container 205 where a chunk 201 is stored. Similarly, for container index 150, entry 172 includes a chunk signature SIG-2 (for a chunk 202), a reference count of 1, and location data 272, and entry 173 includes a chunk signature SIG-3 (for a chunk 203), a reference count of 1, and location data 273.

In the example of FIG. 1, container index 151 corresponding to container 251 includes entries 181, 182, etc., each including a respective chunk signature 162, a reference count 164, and location data 165. For example, entry 181 includes a chunk signature SIG-9 (for a chunk not shown), a reference count of 1, and location data 281, and entry 182 includes a chunk signature SIG-7 (for a chunk not shown), a reference count of 15, and location data 282. Container index 152 corresponding to container 252 includes entries 191, 192, etc., each including a respective chunk signature 162, a reference count 164, and location data 165. For example, entry 191 includes a chunk signature SIG-4 (for a chunk 204), a reference count of 2, and location data 291, and entry 192 includes a chunk signature SIG-5 (for a chunk 205), a reference count of 1, and location data 292.

In some examples, for each chunk of data stream 130, instructions of deduplication system 100 may determine whether an identical chunk is already stored in a container of a deduplication domain of deduplication system 100. To do so, instructions 128 may compare the chunk signature of the given chunk against chunk signatures of at least one container index of the deduplication domain to determine whether any chunk signature of the searched container index(es) matches the chunk signature of the given chunk. When no chunk signature matching the chunk signature of the given chunk is found in the searched container index(es), instructions 128 may add the given chunk to a container of deduplication system 100 and add an entry for the given chunk in a container index corresponding to that container. In other examples, when a chunk signature matching the chunk signature of the given chunk is found in the searched container index(es), instructions 128 may determine that a chunk identical to the given chunk is already stored in a container of the deduplication domain. In response to this determination, instructions 128 may increment the reference count 164 of the entry having the matching chunk signature, and may omit adding the given chunk to a container (as it is already present in one of the containers), thereby avoiding storing a duplicate chunk in the deduplication system 100.

In examples described here, instructions 128 may determine chunk signatures using a signature function that derives a given chunk signature from a given chunk such that the given chunk signature is representative of the content of the given chunk and is distinguishable, with a very high probability, from similarly-derived chunk signatures for other similarly-sized chunks. That is, instructions 128 may derive the chunk signatures such that there is a very low probability of collisions (i.e., chunk signatures matching for chunks that do not have identical content) for similarly-sized chunks. Thus, in examples described herein, a deduplication system may determine that two chunks contain identical content (for deduplication purposes) based on their chunk signatures matching, as described above.

In some examples, it may be impractical for in 128 to search all chunk signatures in a deduplication domain for each chunk of an incoming data stream 130, as this may unacceptably reduce performance, particularly as the amount of data stored in the deduplication domain grows. As such, examples described herein may select a limited number of container indexes (of the deduplication domain) in which to search to identify chunk signatures matching those of chunks of an incoming data stream 130.

Searching fewer than all of the container indexes of a given deduplication domain is likely to result in missing identification of some identical chunks (and thus storing some duplicates), and thus is likely to reduce the overall deduplication ratio (i.e., the ratio of the size of the original data stream to the size of a deduplicated representation of the data stream) for a data stream. However, a beneficial deduplication ratio may still be obtained by appropriately choosing which of the container indexes to search for a given portion of a data stream. In this manner, examples described herein may benefit from higher performance (e.g., data throughput) of deduplication system 100 from searching fewer than all container indexes, while also maintaining a sufficiently high deduplication ratio to justify the tradeoff.

To appropriately choose container indexes to search, a deduplication system may exploit the tendency of chunks in data streams sent for backup to reoccur together (i.e., which may be referred to as "data locality"), in some examples. In examples described herein, instructions 125 may identify a set of container indexes to search for each portion of an incoming data stream. For a given portion 132, to appropriately choose container indexes to search, instructions 125 may sample chunk signatures 270 (i.e., choose fewer than all of them), which were determined from chunks 260 of portion 130, and identify which container indexes (of the deduplication domain) have the most hits for the chunk signatures sampled from the given portion. In examples described herein, a container index has a "hit" for a given chunk signature when the container index comprises an entry including the given chunk signature. Due to data locality, the set of one or more container indexes having the most hits for the sampled chunk signatures in the sparse index 140 would be expected to have matches for many of the sampled and non-sampled chunk signatures of the given portion 132. As such, the container index(es) with the most hits are expected to be appropriate container indexes to select for deduplication of the given portion in attempting to obtain a relatively high deduplication ratio for the given portion.

In some examples, instructions 125 may use a sparse index 140 to efficiently identify container indexes with the most hits for the chunk signatures sampled from a given portion. In examples described herein, a "sparse index" may map each of a plurality of chunk signatures to a respective container index (of a deduplication domain) having an entry including that chunk signature. In some examples, a sparse index may map sampled chunk signatures to the container indexes of a deduplication domain that contain entries for those chunk signatures. In some examples, chunk signatures having a given property (e.g., having a value of zero at the first n bits of the chunk signature, where "n" is an integer) may be sampled from a collection of chunk signatures. In such examples, the sparse index 140 may maintain mappings exclusively for chunk signatures having the given property (i.e., chunk signatures that may be sampled from a portion), to thereby keep the sparse index 140 small enough to be stored in memory (e.g., dynamic random access memory (DRAM), or the like) of the deduplication system 100, which may benefit performance of the deduplication system 100.

An example of the selection of container indexes based on sampled chunk signatures and using a sparse index is now explained in relation to FIG. 1. As noted above, instructions 128 may divide portion 132 (of data stream 130) into chunks 260, obtain chunk signatures 270 for chunks 260, respectively, and sample, as described above, some of chunk signatures 270 to look up in sparse index 140. In the example of FIG. 1, instructions 128 may sample chunk signatures SIG-1, SIG-3, and SIG-5 (e.g., select them based on a given property), and then look up the sampled chunk signatures in sparse index 140. In the example of FIG. 1, sparse index 140 includes a plurality of entries 141-145, etc., each including a chunk signature 147 (having the given property used for sampling, as described above) mapped to an identifier 148 for a container index. In examples described herein, sparse index 140 may include any suitable number of entries. In the example of FIG. 1, sparse index 140 includes a chunk signature SIG-1 mapped to a container index identifier "CI-150" for container index 150, a chunk signature SIG-3 mapped to identifier "CI-150" for container index 150, a chunk signature SIG-9 mapped to identifier "CI-151" for a container index 151, a chunk signature SIG-8 mapped to identifier "CI-150", and a chunk signature SIG-5 mapped to identifier "CI-152" for container index 152.

Continuing the above example, instructions 125 may look up sampled chunk signatures SIG-1, SIG-3, and SIG-5 in sparse index 140, and identify container index 150 (having identifier CI-150) as having two hits (for chunk signatures SIG-1 and SIG-2), and container index 152 (having identifier CI-152) as having one hit, which is for chunk signature SIG-5. In such examples, instructions 125 may identify these container indexes 150 and 152 as having hits, and as such, as potential container indexes to retrieve for use in attempting to find matches for chunk signatures for portion 132.

In the example shown in FIG. 1, container index 150 has two hits, and container index 152 has one hit, based on the sampled chunk signatures, while container indexes 151 and 153 do not have any hits based on the sampled chunk signatures. While this example is shown to illustrate concepts utilized herein, in other examples, many more sampled chunk signatures may be looked up in the sparse index, more container indexes may be identified, and one or more container indexes may have more than one hit based on the sampled chunk signatures.

Once instructions 125 identify container indexes with hits based on the sampled chunk signatures, instructions 126 may select the container indexes having the most hits for use in performing deduplication for portion 132. In some examples, deduplication system 100 may have a container index threshold 112 that may indicate a maximum number of container indexes that may be used for deduplication of a given portion. Continuing the example of FIG. 1, container index threshold 112 may have a value of 2. In such examples, instructions 126 may select for retrieval at most two of the container indexes having hits based on the sampled chunk signatures. For example, while container indexes 150, 152, and 153 each had hits, as described above, instructions 126 may select and retrieve container indexes 150 and 152 exclusively (i.e., not container index 153 or any other container index having no hits). In some examples, deduplication system 100 may select the container indexes having the most hits, up to the container index threshold 112. While the container index threshold 112 may be 2 in the above example, for simplicity of explanation, in other examples, the container index threshold 112 may be higher (or may be any suitable value).

In examples described herein, a deduplication system may use a combination of different types of storage devices to balance cost and performance. For example, while volatile storage devices, such as dynamic random-access memory (DRAM) devices or the like, may provide very low latency for read and write operations, it is also relatively expensive per unit of data storage. Such volatile storage devices are also not suitable for persistent storage of data being backed up in a deduplication system, as volatile storage devices lose the data stored thereon when power is lost. In contrast, non-volatile storage devices (also referred to as "persistent storage" herein), such as hard disk drives (HDDs), may provide higher latency for read and write operations, but are much less expensive per unit of data storage, and, being non-volatile, do not lose stored data when power is lost, and as such are suitable for persistent storage of data backed up in a deduplication system. As such, in examples described herein, the data structures of a deduplication domain may be persistently stored in non-volatile memory, but retrieved into memory of a deduplication system when being used for deduplication, restoration of a data stream from the deduplicated representation, or the like.

However, in examples described herein, data structures such as container indexes are retrieved very frequently from persistent storage into memory when performing deduplication, as described above. As such, the higher latency of HDDs, for example, may inhibit the performance (e.g., throughput) of the deduplication system 100.

To address these issues, examples described herein may utilize non-volatile storage with lower latency for storage of container indexes. For example, referring to FIG. 1, deduplication system 100 utilize one or more solid state drives (SSDs), which may be flash storage device(s), as storage 102 to store the container indexes 220, as many SSDs have much lower latency for read and write operations than many HDDs. However, many SSDs are much more expensive per unit of data storage capacity than many HDDs. So, it may be cost effective to maintain other kinds of data of a deduplication domain (e.g., containers 222, manifests, etc.) on one or more HDDs (e.g., implementing storage 101), since these may be read from and written to persistent storage less frequently than the container indexes, and thus the lower latency of the HDD(s) may have less of a performance impact.

However, many of SSDs have lesser operational lives for write operations than many of HDDs (i.e., the SSDs may wear out after a lesser number of writes compared to the HDDs), which may pose an issue for frequent reading and writing of the container indexes to SSD(s), as the SSDs may not last sufficiently long under use by a deduplication system, such as deduplication system 100, for storage of container indexes.

To address these issues, examples described herein may modify a deduplication process, based on the amount of wear experienced by the lower-latency persistent storage device(s) (e.g., SDD(s)), in order to reduce the amount of data written to the lower-latency persistent storage device(s) in order to extend their operational life, while also enabling the deduplication system to maintain both relatively high performance (e.g., throughput) and a relatively high deduplication ratio.

For example, examples described herein may obtain an indication of an amount of wear experienced by storage device(s) storing container indexes of a deduplication system, and may adjust a container index threshold (described above) based on the amount of wear. For example, when examples described herein determine the amount of wear to be sufficiently high, the container index threshold may be increased, such that a greater number of container indexes with hits may be retrieved for use in matching chunk signatures of a given portion. In such examples, allowing more container indexes to be searched may increase the likelihood of a matching chunk signature being found among the container indexes, which may in turn reduce the total size of the container indexes being stored on the storage device(s), since a new container index entry is written for each chunk signature for which no match is found among the searched container indexes. In this manner, examples described herein may reduce the amount of container index data written to storage device(s) based on the amount of wear experienced by the storage device(s), to thereby extend the operational life of the storage device(s).

To illustrate the savings in the amount of data written to the storage device(s), numerical examples are presented below. In some examples, each container index entry for a chunk signature may be about 56 bytes of data. Thus, if examples described herein were able to match even one additional chunk signature per portion by increasing the container index threshold, then that would prevent about 56 bytes of container index data (i.e., a single new entry) from being written to the storage device(s) per portion. In some examples, a portion may be about 20 MB of data, so a data stream having a total size of 1 GB may be divided into 50 portions of 20 MB each. In such examples, preventing one additional entry from being written per portion would prevent about 2.8 KB (i.e., 56 bytes*50 portions=2800 bytes) from being written per 1 GB of data of a data stream. As another example, a single chunk signature may represent about 8 KB of a data stream, so there would be about 125,000 chunk signatures to represent 1 GB of data of a data stream (i.e., 1 GB/8 KB=125,000). So, if increasing the container index threshold leads to even an additional 1% of additional chunk signature matches being found, that would prevent 1,250 (i.e., 1% of 125,000) of entries from being added to the container indexes and written to the storage device(s), which would be a savings of about 70 KB (i.e., 1,250*56 bytes=70,000 bytes) per 1 GB of data of a data stream.

Examples will be described below in relation to FIGS. 1 and 2. As described above, FIG. 1 is a block diagram of an example deduplication system 100, comprising at least one processing resource 110 and at least one machine-readable storage medium 120 comprising instructions executable by processing resource(s) 110 to implement functionalities of deduplication system 100 described herein. In the example of FIG. 1, deduplication system 100 may comprise memory 103 (which may be implemented by one or more volatile storage devices, such as DRAM devices, as described above), storage 101 that may be implemented by one or more storage devices of a first type, and storage 102 that may be implemented by one or more storage devices of a second type different than the first type. In some examples, the storage devices of the second type may be storage devices having a lesser operational life for write operations than storage devices of the first type. For example, storage device(s) of the first type may be HDDs, and storage device(s) of the second type may be SSDs having a lesser operational life for writes (e.g., wearing out after fewer writes) than the HDDs. In other examples, different types of storage device(s) may be used as the first and second types (where the second type has a lesser operational life for writes than the first type). In the example of FIG. 1, storage 102 may store container indexes 220 of a given deduplication domain of deduplication system 100, and storage 101 may comprise containers 222 of the given deduplication domain.

Figure 2:
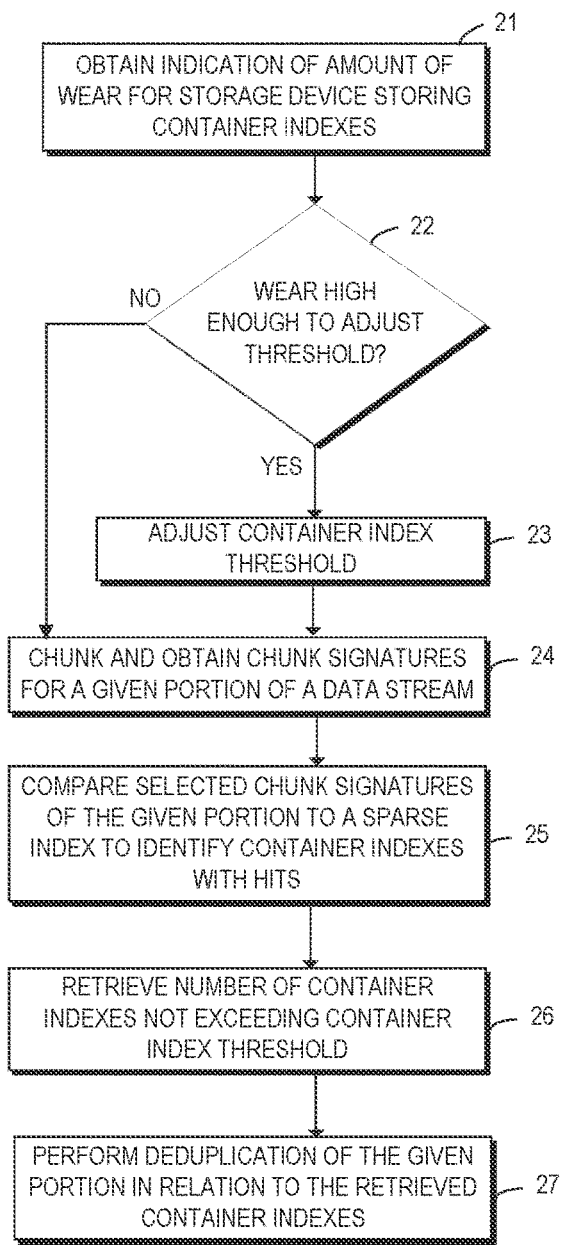
FIG. 2 is a flowchart of an example method that includes adjusting a container index threshold.

FIG. 2 is a flowchart 20 of an example method that includes adjusting a container index threshold. Although execution of method 20 is described below with reference to deduplication system 100 of FIG. 1, other computing systems suitable for the execution of method 20 may be utilized (e.g., deduplication system 400 of FIG. 4, computing device 700 of FIG. 7, etc.). Additionally, implementation of method 20 is not limited to such examples.

Referring to FIGS. 1 and 2, at 21 of method 20, instructions 122 of deduplication system 100 (e.g., when executed by at least one processing resource 110) may obtain an indication of an amount of wear 160 experienced by at least one storage device of storage 102 storing a plurality of container indexes 220 of the given deduplication domain deduplication system 100.

At 22, instructions 124 may determine whether the amount of wear is high enough to adjust a container index threshold 112 of deduplication system 100. If so, then at 23, instructions 124 may adjust container index threshold 112 based on the indicated amount of wear 160. If not, adjustment of container index threshold 112 may be omitted and method 20 may proceed to 24 (discussed below).

In examples described herein, both the determination of whether the amount of wear is high enough to adjust container index threshold 112, at 22, and the adjustment of container index threshold 112, at 23, may be performed in a number of different ways in different embodiments. For example, instructions 124 may determine to adjust container index threshold 112 based on whether the amount of wear 160 experienced by the at least one storage device of storage 102 has exceeded a threshold amount of wear. In some examples, instructions 124 may increase container index threshold 112 based on a determination that the amount of wear 160 experienced by the at least one storage device storage 102 has exceeded the threshold amount of wear. In examples described herein, a container index threshold 112 may have any suitable positive integer value, and increasing the container index threshold 112 may include increasing the value of container index threshold 112 by any suitable positive integer amount (e.g., one or more), which may be determined in any suitable manner.

In some examples, there may be a single threshold amount of wear, and when instructions 124 determine that the amount of wear 160 has exceeded that threshold, instructions 124 may increase container index threshold 112 once. In other examples, instructions 124 may adjust container index threshold 112 multiple times as the amount of wear 160 increases over the life of deduplication system 100. For example, instructions 124 may successively increase container index threshold 112 as the amount of wear 160 for the at least one storage device of storage 102 increases over the life of deduplication system 100. In such examples, the amount of the increase(s) and the amount(s) of wear at which instructions 124 make the increases may be any suitable values. As one example, deduplication system 100 may comprise a plurality of successively greater wear level boundaries to which to compare the amount of wear 160 obtained from storage 102. In such examples, instructions 124 may increase container index threshold 112 each time amount of wear 160 is determined to have exceeded a next boundary of the plurality of successively greater wear level boundaries. In such examples, each increase of container index threshold 112 may be by the same amount, or by different amounts, or some may be by the same amount while others may be of different amounts, or the like. The respective increase amounts corresponding to crossing respective boundaries may be determined in any suitable manner.

In examples described herein, the indication of the amount of wear 160 experienced by the at least one storage device of storage 102 may take any suitable form and may be used to make the above determinations in any suitable manner according to the form taken by the indicated amount of wear 160. For example, the amount of wear 160 indicated by storage 102 may represent an estimate of a magnitude of the amount of wear experienced by the storage device(s), such as a value between 0 and 100, where 0 represents a minimum amount of wear, and 100 represents a maximum amount of wear. In such examples, the value may represent (or be used to derive) a percentage of the total life of the storage device(s) that has been used (e.g., 5 indicating that 5% of the life has been used, while 95% of the life remains). In other examples, any other suitable range may be used. In such examples, instructions 124 may determine whether the amount of wear 160 has exceeded threshold(s) in the range by determining whether the value of the amount of wear 160 is greater than the value of the threshold (i.e., for each of the threshold(s)).

In other examples, the amount of wear 160 may be represented by an estimate of an amount of life left for the storage device(s), in a range of 100 to 0 (though other suitable ranges may be used). For example, a value of 100 may indicate 100% of life left for the device(s), while a value of 95 may indicate that 95% of the life of the device(s) remain or that 5% of the life has been used. In such examples, instructions 124 may determine whether the amount of wear 160 has exceeded threshold(s) in the range by determining whether the value of the amount of wear 160 is less than the value of the threshold (i.e., for each of the threshold(s)), since in such examples, the lesser values indicate greater amounts of wear. For example, a threshold may be set to 50 (e.g., 50% of life left) and instructions 124 may determine whether the amount of wear 160 is less than 50, in examples in which a value less than 50 may indicate that the device(s) have less than 50% of life left, for example. In other examples, when the amount of wear 160 is represented by an estimate of an amount of life left, instructions 124 may convert that into an amount of wear experienced (e.g., a life left value of 95 converted to a wear value of 5), and instructions 124 may determine whether the converted amount is greater than respective threshold(s) of the appropriate range. Although various examples are given above, in examples described herein, any suitable technique may be used to determine whether a given value of the amount of wear 160 exceeds one or more threshold amount(s) of wear.

In examples described here, instructions 122 may obtain the indication of the amount of wear 160 from a single storage device of storage 102. In some examples, storage 102 may comprise a plurality of storage devices implementing storage 102 and may report a collective wear level 160 (e.g., a "logical" wear level) representative of a collective (e.g., cumulative, average, or the like) amount of wear experienced the plurality of storage devices. For example, instructions 122 may access (e.g., request, retrieve, etc.) Self-Monitoring, Analysis and Reporting Technology (S.M.A.R.T.) data from storage 102 that indicates a wear level for a logical volume implemented by a plurality of storage devices (e.g., SSDs). In such examples, instructions 122 may use the S.M.A.R.T. data as the amount of wear 160, or derive the amount of wear 160 from it. In other examples, instructions 122 may obtain the indication of an amount of wear from each of a plurality of devices of storage 102 and determine a collective or logical amount of wear 160 for the devices.

Continuing to 24 of method 20 of FIG. 2, instructions 128 may divide a portion 132 of data stream 130 into chunks 260 and determine respective chunk signatures 270 for the chunks 260, as described above. At 25, instructions 125 may identify, among the plurality of container indexes 220, container indexes having hits for portion 132 of data stream 130, as described above. For example, instructions 125 may select (e.g., sample) chunk signatures from among chunk signatures 270 as described above (e.g., based chunk signatures that satisfy a given property). Instructions 125 may, as described above, use the selected chunk signatures for comparison with sparse index 140, which maps chunk signatures (that satisfy the given property) to container indexes of the plurality of container indexes 220. Instructions 125 may compare the selected chunk signatures derived from portion 132 to sparse index 140 to identify the container indexes having hits for the portion 132. In such examples, instructions 125 may identify each of the container indexes having an identifier to which a given one of the selected chunk signatures is mapped in sparse index 140. In such examples, for each container index having at least one hit, instructions 125 may maintain a count of how many hits each of those container indexes had based on the selected chunk signatures. In such examples, for each of the selected chunk signatures having an entry in sparse index 140, the count of hits may be increased for the container index having the identifier to which the selected chunk signature is mapped in sparse index 140.

Continuing method 20, at 26, instructions 126 may retrieve a number of the identified container indexes (having hits for portion 132) from storage device(s) of storage 102, where the number retrieved does not exceed container index threshold 112. In such examples, instructions 126 may retrieve the number of identified container indexes from storage 102 (e.g., SSDs) to memory 103 for use in deduplication of portion 132. In examples described herein, wherein a container index threshold may be a maximum number of identified container indexes to be read from persistent storage into memory for deduplication of a single portion of any data stream. In some examples, the container index threshold 112 may be an increased container index threshold 112 that was previously increased at 23 of method 20. In other examples, the container index threshold 112 may have an initial value (i.e., it has not been adjusted at 23 based on wear). In some examples, when the number of container indexes having hits for a given portion is greater than the container index threshold 112, the container indexes having the most hits may be chosen, up to a number that does not exceed container index threshold 112. At 27, instructions 128 may perform deduplication of portion 132 using (i.e., in relation to) the container indexes retrieved into memory 103 for portion 132.

Referring again to FIGS. 1 and 2, container index threshold 112 may have an initial value of 1. Although a container index threshold 112 with a value of 1 may be unlikely, such an example will be used for explanatory purposes to facilitate understanding. In such examples, at 21 of method 20, instructions 122 may obtain may obtain an indication of an amount of wear 160 experienced by storage device(s) of storage 102 (storing container indexes 220). In this example, the amount of wear may have a value of 51 in a range of 1 to 100, and a threshold amount of wear for deduplication system 100 may be 50. In such examples, at 22, instructions 124 may determine that the amount of wear 160 (i.e., 51) is high enough to adjust a container index threshold 112, since the amount of wear 160 (i.e., value of 51) is greater than the threshold amount of wear (i.e., 50). Based on that determination, at 23, instructions 124 may increase container index threshold 112 by one (chosen for ease of understanding), thereby adjusting container index threshold 112 from a value of 1 to a value of 2.

With the value of container index threshold 112 now set to 2 in this example, method 20 may proceed to perform deduplication of portion 132. At 24, instructions 128 may divide portion 132 of data stream 130 into chunks 260 and determine respective chunk signatures 270 for the chunks 260. At 25, instructions 125 may use selected (e.g., sampled) chunk signatures from chunk signatures 270 and sparse index 140 to identify container indexes having hits for portion 132 of data stream 130, as described above. For example, referring to the example illustrated in FIG. 1, among chunk signatures 270, instructions 125 may select chunk signatures SIG-1, SIG-3, and SIG-5 (illustrated in bold) for comparison to sparse index 140, based on having the given property for sampling, as described above.

At 25, instructions 125 may compare selected chunk signatures SIG-1. SIG-3, and SIG-5 to sparse index 140, and determine that chunk signature SIG-1 is mapped to identifier CI-150 for container index 150 (giving container index 150 one hit), determine that chunk signature SIG-3 is mapped to identifier CI-150 (giving container index 150 two hits total), and determine that chunk signature SIG-5 is mapped to identifier CI-152 for container index 152 (giving container index 152 one hit).

At 26, instructions 126 may retrieve a number of the identified container indexes (having hits for portion 132) from storage device(s) of storage 102, where the number retrieved does not exceed container index threshold 112. In this example, the value of container index threshold 112 is two, so instructions 126 may retrieve both container indexes 150 and 152. If more container indexes had hits, then instructions 126 may have had to choose the two container indexes with the most hits (with any appropriate tie breaking mechanism, for example). Instructions 126 may then retrieve container indexes 150 and 152 into memory 103 (not shown), and at 27, instructions 128 may perform deduplication of portion 132 in relation to (i.e., using) the retrieved container indexes 150 and 152.

For example, instructions 128 may find a respective match for each of chunk signatures SIG-1, SIG-2, and SIG-3 in container index 150, indicating that chunks 201, 202, and 203 are duplicates of chunks already stored in containers 222. In such examples, instructions 128 may omit adding any of chunks 201, 202, and 203 to a container, and may instead increment the reference counts for chunk signatures SIG-1, SIG-2, and SIG-3 in container index 150, thereby deduplicating those chunks, and not adding any new entries to any container indexes (and thus not adding to the overall size of the container indexes 220 stored on storage 102). Similarly instructions 128 may find a respective match for each of chunk signatures SIG-4 and SIG-5 in container index 152, indicating that chunks 204 and 205 are duplicates of chunks already stored in containers 222. In such examples, instructions 128 may omit adding either of chunks 204 and 205 to a container, and may instead increment the reference counts for chunk signatures SIG-4 and SIG-5 in container index 152, thereby deduplicating those chunks, and not adding any new entries to any container indexes (and thus not adding to the overall size of the container indexes 220 stored on storage 102). Each of chunk signatures SIG-1-SIG-5 may also be added to a manifest for portion 132 (not shown), along with references to the container indexes in which they have entries.

To show an example of the impact of increasing the container index threshold 112, the above example will be discussed again using the initial container index threshold 112 value of 1. In such examples, at 25, instructions 125 may compare selected chunk signatures SIG-1, SIG-3, and SIG-5 to sparse index 140 and determine that container index 150 has two hits and that container index 152 has one hit, as described above. With a value of two for container index threshold 112, at 26, instructions 126 may choose the container index with the most hits (i.e., container index 150) and retrieve that container index, but may not retrieve container index 152, as that would exceed container index threshold 112. In such examples, when instructions 128 perform deduplication of portion 132 in relation to (i.e., using) the retrieved container index 150 at 27, instructions 128 may find matches for chunk signatures SIG-1, SIG-2, and SIG-3, as described above. However, chunk signatures SIG-4 and SIG-5 would likely not be matched, as container index 152 was not retrieved (as long as container index 150 does not also contain chunk signatures SIG-4 and SIG-5). In such examples, chunks 204 and 205 would be added to a new container, and new entries would be added to its container index for chunks 204 and 205 (i.e., for chunk signatures SIG-4 and SIG-5), leading to a growth in the total size of the container indexes, compared to when the container index threshold 112 was higher. In this manner, examples described herein may reduce the total size of the container indexes written to storage 102 by adjusting the container index threshold 112 based on the amount of wear experienced by storage 102.

In some examples, instructions 129 may adjust a compaction threshold 114, based on an amount of wear experienced by storage 102, as described below in relation to example deduplication system 400 and method 300 of FIG. 3, either as an alternative to or in addition to adjusting container index threshold 112, based on an amount of wear experienced by storage 102, as described above.

Examples of adjustment of a compaction threshold based on an amount of wear experienced by one or more storage devices is described below in relation to FIGS. 3 and 4. FIG. 3 is a flowchart of an example method 300 that includes adjusting a compaction threshold. FIG. 4 is a block diagram of an example deduplication system 400 with an adjustable compaction threshold.

In the example illustrated in FIG. 4, deduplication system 400 may be deduplication system similar to deduplication system 100 described above in relation to FIG. 1, with different amounts of detail shown for various aspects of deduplication system 400 for explanation of other features of examples described herein. In FIGS. 1 and 4, like features may be labeled with like reference symbols for ease of understanding. For example, like deduplication system 100, deduplication system 400 may comprise at least one processing resource 110 and at least one machine-readable storage medium 120 comprising instructions executable by processing resource(s) 110 to implement functionalities of deduplication system 400 described herein, the instructions including instructions 122, 124, 125, 126, and 128, described above in relation to FIG. 1, and instructions 129 described below in relation to FIG. 4 (although deduplication system 100 also includes instructions 129).

Like deduplication system 100, deduplication system 400 may comprise memory 103 (which may be implemented by one or more volatile storage devices, such as DRAM devices, as described above), storage 101 that may be implemented by one or more storage devices of a first type, and storage 102 that may be implemented by one or more storage devices of a second type different than the first type. In some examples, the storage devices of the second type may be storage devices having a lesser operational life for write operations than storage devices of the first type. For example, storage device(s) of the first type may be HDDs, and storage device(s) of the second type may be SSDs having a lesser operational life for writes (e.g., wearing out after fewer writes) than the HDDs. In other examples, different types of storage device(s) may be used as the first and second types (where the second type has a lesser operational life for writes than the first type).

In the example of FIG. 4, storage 102 may store container indexes 220 of a given deduplication domain of deduplication system 400, including container indexes 150-153, etc. In the example of FIG. 4, more entries of container indexes 150 and 151 are illustrated for explanation of examples relating to adjusting a compaction threshold as described below in relation to FIG. 4. In the example of FIG. 4, container index 150 includes at least entries 171-178, each entry comprising a respective chunk signature 162, a respective immutable flag 163, a respective reference count 164, and respective location data 165 (as described above). In FIG. 4, entries 171-173 are as described above in relation to FIG. 1, and each of entries 174-178 comprise chunk signatures SIG-15-SIG-19, respectively, and location data 274-278, respectively. Each of entries 171-178 includes a respective reference count (indicated by reference symbol 164), and a respective immutable flag (indicated by reference symbol 163) each having a value of "T" (representing true) or "F" (representing false). In examples described herein, an immutable flag indicates whether or not the entry with that flag is able to be changed or removed. For example, an immutable flag of "F" for an entry indicates that the entry has not been indicated as immutable, and as such the reference count of the entry may be modified, and the entry may be removed from the container index when it has a reference count of zero. An immutable flag of "T" for an entry indicates that the entry has been indicated as immutable, and as such the reference count of the entry may not be modified, and the entry may not be removed from the container index (i.e., it's reference count is not able to be decremented to zero). Although example values of "T" and "F" are used in examples herein for purposes of explanation, an immutable flag indicating that an entry has been marked as immutable to prevent changes may take any suitable form (e.g., a bit 1 or 0, a particular value of the reference count, or the like).

In the example of FIG. 4, container index 151 includes at least entries 181-188, each entry comprising a respective chunk signature 162, a respective immutable flag 163, a respective reference count 164, and respective location data 165 (as described above). In FIG. 4, entries 181-182 are as described above in relation to FIG. 1, and each of entries 183-188 comprise chunk signatures SIG-20-SIG-25, respectively, and location data 283-288, respectively. Each of entries 181-188 includes a respective reference count (indicated by reference symbol 164), and a respective immutable flag (indicated by reference symbol 163). Container indexes of deduplication system 100 of FIG. 1 may also include immutable flag values in each entry as described herein.

In the example of FIG. 4, memory 103 of deduplication system 400 may comprise a sparse index 140 (illustrated in more detail in FIG. 1, for example), a container index threshold 112 as described above, and a compaction threshold 114. Storage 101 of deduplication system 400 may comprise containers 222 (illustrated in more detail in FIG. 1, for example), and manifest(s), such as manifest 232.

As explained below, examples described herein may adjust a compaction threshold based on wear. In examples described herein, compaction may refer to a process of reducing the size of one or more container indexes by removing unreferenced entries from the respective container index(es). In some examples, the reference count of an entry may indicate whether the entry is unreferenced. For example, an entry with a reference count of zero may be considered an unreferenced entry. In some examples, a container index may be compacted by re-writing the container index, including exclusively the referenced entries (e.g., entries with a reference count greater than zero) to another portion of storage. In such examples, the storage that previously held the container index with unreferenced entries may be freed for reuse. There may be many benefits to performing such compaction (or "housekeeping"), such as preventing storage 102 from becoming too full, etc.

However, inefficiencies may arise when unreferenced entries are removed from the container indexes shortly before chunks signatures that would match chunk signatures of the unreferenced entries are processed. For example, referring to the example of FIG. 4, if compaction were performed on container index 150 at a first point in time (removing entries for chunk signatures SIG-15, SIG-16, SIG-18, and SIG-19), and then at a second point in time shortly after a portion is being deduplicated and includes chunks with chunk signatures matching chunk signatures SIG-15, SIG-16, and SIG-19, for example, new entries may have to be created for chunk signatures SIG-15, SIG-16, and SIG-19, since they are no longer present in container index 150. As such, this may lead to more data being written for the container indexes. However, if the compaction of container index 150 had been delayed until after the second point in time, then chunk signatures SIG-15, SIG-16, and SIG-19 may have been matched to with chunk signatures in container index 150, and reference counts could be adjusted for these chunk signatures, without adding new entries to the container indexes.

To address these issues, examples described herein may adjust a compaction threshold based on an amount of wear experienced by storage 102, in order to reduce the amount of container index data written to storage 102 as its wear increase. In examples described herein, a compaction threshold may be a threshold number of unreferenced entries that qualifies a container index for compaction. For example, a compaction threshold 114 may have an initial value of 4, indicating that container indexes with 4 or more unreferenced entries are eligible for compaction, while container indexes with fewer than 4 unreferenced entries are not eligible for compaction. Although a compaction threshold 114 with a value of 4 may be unlikely, such an example will be used for explanatory purposes to facilitate understanding. In such examples, both container index 150 and container index 151 may be eligible for compaction at the point in time illustrated in FIG. 4, since both have 4 or more unreferenced entries. However, this may lead to creation of new entries for chunk signatures of any of those unreferenced entries, which may be inefficient if they are received near in time after the compaction, and thus may have been avoided by waiting.

As such, in examples described herein, instructions 124 may adjust the compaction threshold 114 based on wear. For example, as wear increases, instructions 124 may increase compaction threshold 114 in an attempt to reduce the writing of new data to the container indexes and thus to storage 102. For example, continuing the example above, based on wear, instructions 124 may increment compaction threshold 114 by 1 for a new value of 5. In such examples, container index 151 may still be compacted (since it has 5 unreferenced entries), but container index 150 may not be eligible for compaction (as 4 unreferenced entries are shown in FIG. 4), so after compaction the entries of chunk signatures SIG-15, SIG-16, SIG-18, and SIG-19 are still available to be matched against for deduplication.

Figure 3:
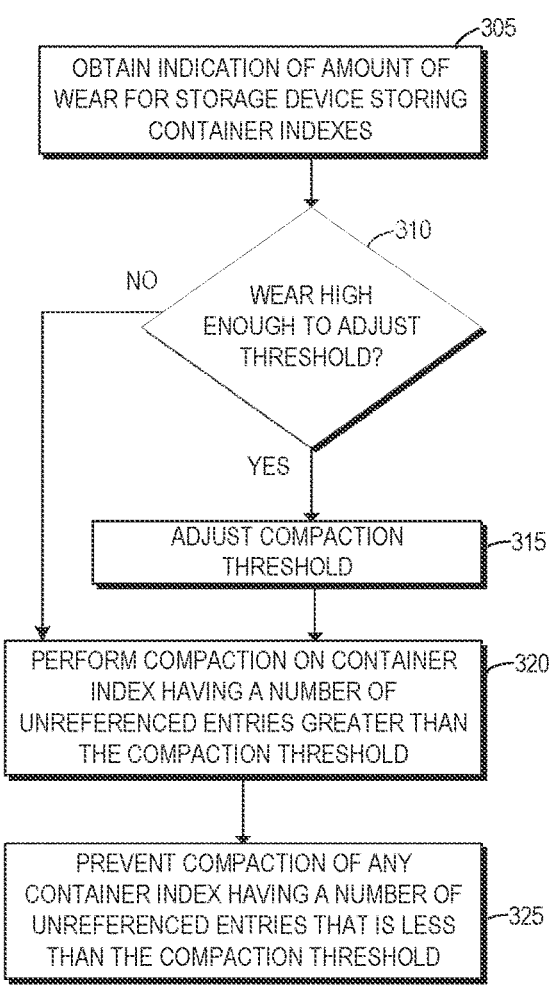
FIG. 3 is a flowchart of an example method that includes adjusting a compaction threshold.
Figure 4:
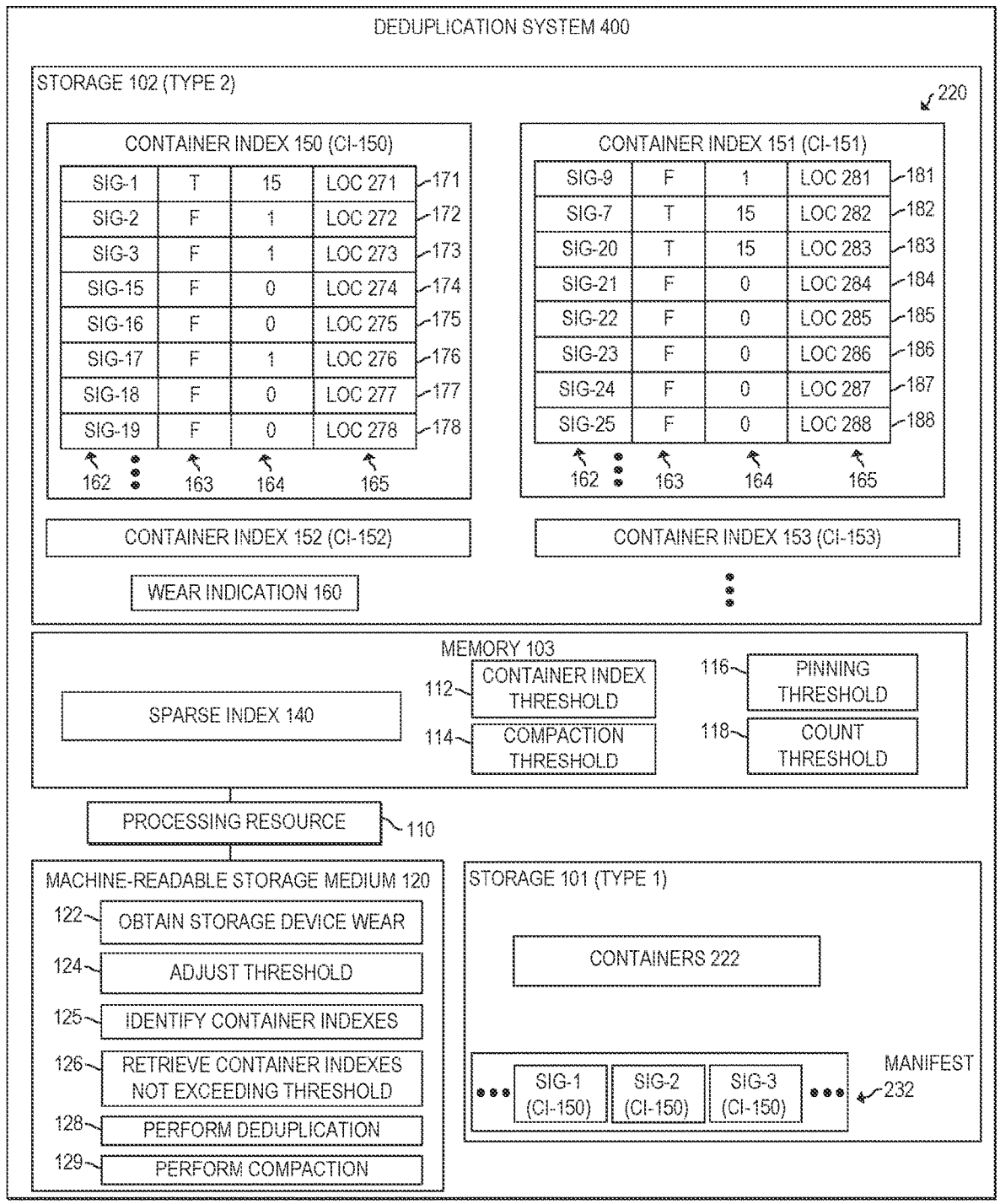
FIG. 4 is a block diagram of an example deduplication system with an adjustable compaction threshold.

FIG. 3 is a flowchart 300 of an example method that includes adjusting a compaction threshold. Although execution of method 300 is described below with reference to deduplication system 400 of FIG. 4, other computing systems suitable for the execution of method 300 may be utilized (e.g., deduplication system 100 of FIG. 1, deduplication system 500 of FIG. 5, etc.). Additionally, implementation of method 300 is not limited to such examples.

Referring to FIGS. 3 and 4, at 305 of method 300, instructions 122 of deduplication system 100 may obtain an indication of an amount of wear 160 experienced by at least one storage device of storage 102 storing a plurality of container indexes 220 of the given deduplication domain deduplication system 100, as described above in relation to FIG. 1. At 310, instructions 124 may determine whether the amount of wear is high enough to adjust a compaction threshold 114 of deduplication system 400. If so, then at 315, instructions 124 may adjust compaction threshold 114 based on the indicated amount of wear 160. If not, adjustment of compaction threshold 114 may be omitted and method 300 may proceed to 320 (discussed below).

In examples described herein, both the determination of whether the amount of wear is high enough to adjust compaction threshold 114, at 310, and the adjustment of compaction threshold 114, at 315, may be performed in a number of different ways in different embodiments. For example, instructions 124 may determine to adjust compaction threshold 114 based on whether the amount of wear 160 experienced by the at least one storage device of storage 102 has exceeded a threshold amount of wear. In some examples, instructions 124 may increase compaction threshold 114 based on a determination that the amount of wear 160 experienced by the at least one storage device storage 102 has exceeded the threshold amount of wear. In examples described herein, a compaction threshold 114 may have any suitable positive integer value, and increasing the compaction threshold 114 may include increasing the value of compaction threshold 114 by any suitable positive integer amount (e.g., one or more), which may be determined in any suitable manner.

In some examples, there may be a single threshold amount of wear, and when instructions 124 determine that the amount of wear 160 has exceeded that threshold, instructions 124 may increase compaction threshold 114 once. In other examples, instructions 124 may adjust compaction threshold 114 multiple times as the amount of wear 160 increases over the life of deduplication system 100. For example, instructions 124 may successively increase compaction threshold 114 as the amount of wear 160 for the at least one storage device of storage 102 increases over the life of deduplication system 100. In such examples, the amount of the increase(s) and the amount(s) of wear at which instructions 124 make the increases may be any suitable values. As one example, deduplication system 100 may comprise a plurality of successively greater wear level boundaries to which to compare the amount of wear 160 obtained from storage 102. In such examples, instructions 124 may increase compaction threshold 114 each time amount of wear 160 is determined to have exceeded a next boundary of the plurality of successively greater wear level boundaries. In such examples, each increase of compaction threshold 114 may be by the same amount, or by different amounts, or some may be by the same amount while others may be of different amounts, or the like. The respective increase amounts corresponding to crossing respective boundaries may be determined in any suitable manner.

In examples described herein, the wear threshold(s), boundar(ies), or the like, used in relation to adjustment of compaction threshold 114 may be independent of the wear threshold(s), boundar(ies), or the like, used in relation to adjustment of container index threshold 112. In some examples, one or more of these wear threshold(s), boundar(ies), or the like, may be the same for compaction threshold 114 and container index threshold 112.

In examples described herein, the adjustment amounts applied to compaction threshold 114 may be independent of the adjustment amounts applied to container index threshold 112. In some examples, the adjustment amounts applied to compaction threshold 114 and container index threshold 112 may in some cases be the same. In examples described herein, the indication of the amount of wear 160 experienced by the at least one storage device of storage 102 may take any suitable form and may be used to make the above determinations in any suitable manner according to the form taken by the indicated amount of wear 160, as described above in relation to FIG. 1.

Referring again to method 300 of FIG. 3, at 320, instructions 129 may perform compaction on a selected one or more of the container indexes 220 having a number of unreferenced entries that is greater than or equal to compaction threshold 114, as described above. For example, to perform compaction, instructions 129 may write the selected container index(es) to different location(s) on the storage device(s) implementing storage 102 without the unreferenced entries of those selected container index(es). At 325, instructions 129 may prevent compaction of any of the container indexes 220 having a number of unreferenced entries that is less than compaction threshold 114 (e.g., by restricting selection of container indexes for compaction to those with a number of unreferenced entries that is greater than or equal to compaction threshold 114).

In some examples, instructions of storage medium 120 of deduplication system 400 may adjust a container index threshold 112, based on an amount of wear experienced by storage 102, as described above in relation to example deduplication system 100 and method 20 of FIG. 2, either as an alternative to or in addition to compaction threshold 114, based on an amount of wear experienced by storage 102, as described above.

In some examples, a deduplication system may determine that certain entries should be prevented from being removed, even if compaction is performed on its container index based on, for example, the entry containing a chunk signature that is matched often. Like increasing the compaction threshold, preventing such entries from being removed may prevent new entries from being created at a later time rather than just referencing a prior entry. For example, deduplication system 400 may comprise a count threshold 118, which may indicate a reference count value at which an entry should be made immutable (e.g., flagged with an immutable flag, as described above), which may be referred to as "pinning" the entry. In such examples, when a reference count reaches a count threshold 118, instructions 129 may designate that reference count as immutable, such that it is not changed while designated as immutable, in any suitable manner.

As an example for ease of understanding, a count threshold 118 may be set at a value such as 15, in some examples. In such examples, any entry with a reference count below 15 may have its reference count updated (incremented or decremented) and may be removed from its container index. For example, each of entries 172-178 of container index 150 has a reference count below the example count threshold 118. In contrast, in the example of FIG. 4, instructions 129 may flag entry 171 of container index 150 as immutable (e.g., mark it with an immutable flag "T" value, as described above) when reference count of entry 171 reaches 15, which is equal to the count threshold 118. In such examples, entry 171 is prevented from being removed from container index 150. In such examples, entries 182 and 183 of container index 151 may also be flagged as immutable based on having reference counts that reached the count threshold 118. In some examples, instructions 129 may begin pinning entries based on the count threshold 118 after the amount of wear 160 experienced by storage 102 has exceeded a pinning threshold 116, which may be a threshold indicating a certain (e.g., relatively high) amount of wear. In some examples, after pinning entries, instructions 129 may unpin any of the pinned entries and recalculate their current values by walking the manifests of the deduplication domain to obtain a current reference count for previously pinned entry.

In some examples, for data that is expected to be encountered with high frequency (e.g., an operating system image, or the like), it may be beneficial to pre-seed a deduplication domain with the a representation of the data for use in deduplication of later user data, and pin the entries of the container index for such data, so that the data is always available for deduplication of user data while it is pinned. For example, such a process may be performed by feeding the data expected to be encountered with high frequency into a deduplication system to perform deduplication on the data, as described above in relation to deduplication system 100 of FIG. 1, for example. Once the data has been deduplicated, as described above, instructions 129 may pin all entries of the container indexes that have been created, so that the data useable to deduplicate that data later is present in the deduplication domain. In some examples, such pre-seeded, pinned data may be present in a deduplication domain of a deduplication system when shipped to an end user to improve performance of the deduplication system, and to reduce writes to the container indexes, as described above in relation to pinning. In such examples, when in use by an end user, a deduplication domain may comprise a plurality of container indexes 220 that includes a subset of container indexes in which the reference count of each entry is designated as immutable (e.g., the pre-seeded, pinned data described above) such that it is not changed while designated as immutable.

Figures 5, 6:
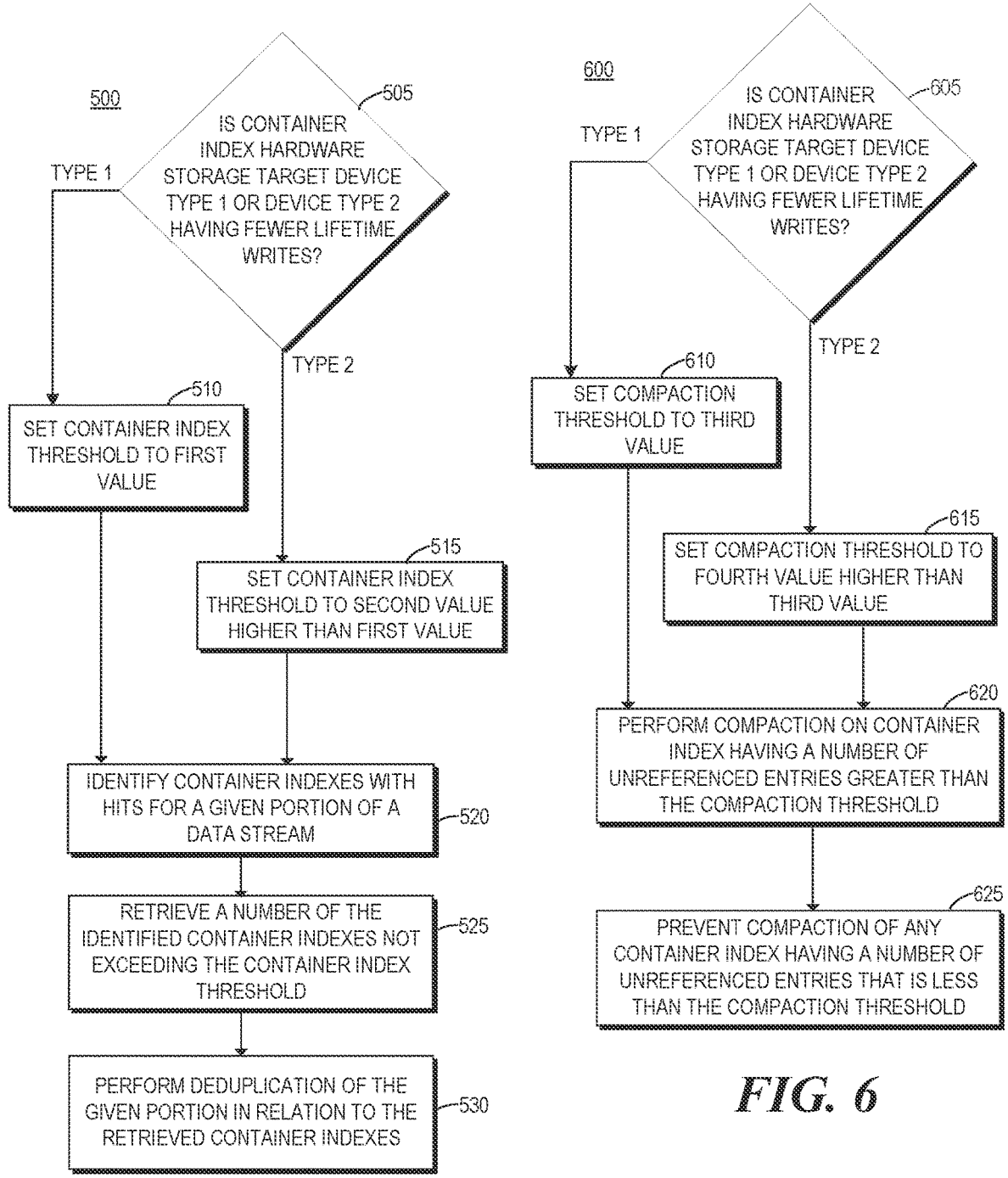
FIG. 5 is a flowchart of an example method that includes setting a container index threshold.
FIG. 6 is a flowchart of an example method that includes setting a compaction threshold.

Examples will now be described herein in relation to FIGS. 1 and 5, where FIG. 5 is a flowchart of an example method 500 that includes setting a container index threshold. Although execution of method 500 is described below with reference to deduplication system 100 of FIG. 1, other computing systems suitable for the execution of method 500 may be utilized (e.g., deduplication system 400 of FIG. 4, or 700 of FIG. 7 etc.). Additionally, implementation of method 500 is not limited to such examples.

At 505 of FIG. 5, instructions 124 may determine whether a hardware storage target 102 for container indexes for deduplication system 100 (i.e., storage device(s) implementing storage 102) comprises one or more storage devices of a first type or one or more storage devices of a second type, wherein storage devices of the second type of have a lesser operational life for write operations than storage devices of the first type. For example, the storage device(s) of the first type may be one or more HDDs, or the like, and the storage device(s) of the second type may be one or more SSDs, or the like.

In response to a determination that deduplication system 100 is to store container indexes on storage device(s) of the first type, instructions 124 may set container index threshold 112 to a first value (i.e., to a lower value) at 510, since the device(s) of the first type have a greater operational life for write operations. In response to a determination that deduplication system 100 is to store the container indexes on storage device(s) of the second type, instructions 124 may set container index threshold 112 to a second value higher than the first value at 510, since the device(s) of the second type have a lesser operational life for write operations.

Proceeding to 520, instructions 128 may store a plurality of container indexes 220 on the hardware storage target 102. At 525, instructions 125 may identify, among the plurality of container indexes 220, container indexes having hits for a given portion 132 of a given data stream 130, as described above in relation to FIG. 1. At 530, instructions 126 may retrieve, from hardware storage target 102, a number of the container indexes having hits, the number not exceeding container index threshold 112 (e.g., having the value set at 510 or 515). At 530, instructions 128 may perform deduplication of the given portion 132 in relation to the retrieved container indexes, as described above.

In some examples, the value to which instructions 124 set the container index threshold 112 in method 500 may be an initial value, which instructions 124 may adjust based on the amount of wear of storage 102, as described above in relation to FIG. 1. For example, after setting the container index threshold 112 to the second value at 515 above and instructions 128 storing container indexes on one or more storage devices of the second type, instructions 124 may increase container index threshold 112 above the second level based on a determination that the one or more storage devices of the second type (i.e., of storage 102) have experienced at least a threshold amount of wear (as described above in relation to FIG. 1). As another example, after setting the container index threshold 112 to the first value at 510 above and instructions 128 storing container indexes on one or more storage devices of the second type, instructions 124 may increase container index threshold 112 above the first level based on a determination that the one or more storage devices of the first type (i.e., of storage 102) have experienced at least a threshold amount of wear (as described above in relation to FIG. 1).

Examples will now be described herein in relation to FIGS. 1 and 6, where FIG. 6 is a flowchart of an example method 600 that includes setting a compaction threshold. Although execution of method 600 is described below with reference to deduplication system 100 of FIG. 1, other computing systems suitable for the execution of method 500 may be utilized (e.g., deduplication system 400 of FIG. 4, or 700 of FIG. 7 etc.). Additionally, implementation of method 600 is not limited to such examples.

At 605 of FIG. 6, instructions 124 may determine whether a hardware storage target 102 for container indexes for deduplication system 100 (i.e., storage device(s) implementing storage 102) comprises one or more storage devices of a first type or one or more storage devices of a second type, wherein storage devices of the second type of have a lesser operational life for write operations than storage devices of the first type. For example, the storage device(s) of the first type may be one or more HDDs, or the like, and the storage device(s) of the second type may be one or more SSDs, or the like.

In response to a determination that deduplication system 100 is to store container indexes on storage device(s) of the first type, instructions 124 may set compaction threshold 114 to a third value (i.e., to a lower value) at 610, since the device(s) of the first type have a greater operational life for write operations. In response to a determination that deduplication system 100 is to store the container indexes on storage device(s) of the second type, instructions 124 may set container index threshold 112 to a fourth value higher than the third value at 510, since the device(s) of the second type have a lesser operational life for write operations. In such examples, the first and second values of the example of FIG. 5 may be different than the third and fourth values of FIG. 6.

Proceeding to 620, instructions 129 may perform compaction on a selected one of container indexes 220 having a number of unreferenced entries that is greater than or equal to compaction threshold 114 (having a value as set at 610 or 615). At 625, instructions 129 may prevent compaction of any of the container indexes having a number of unreferenced entries that is less than compaction threshold 114.

Figure 7:
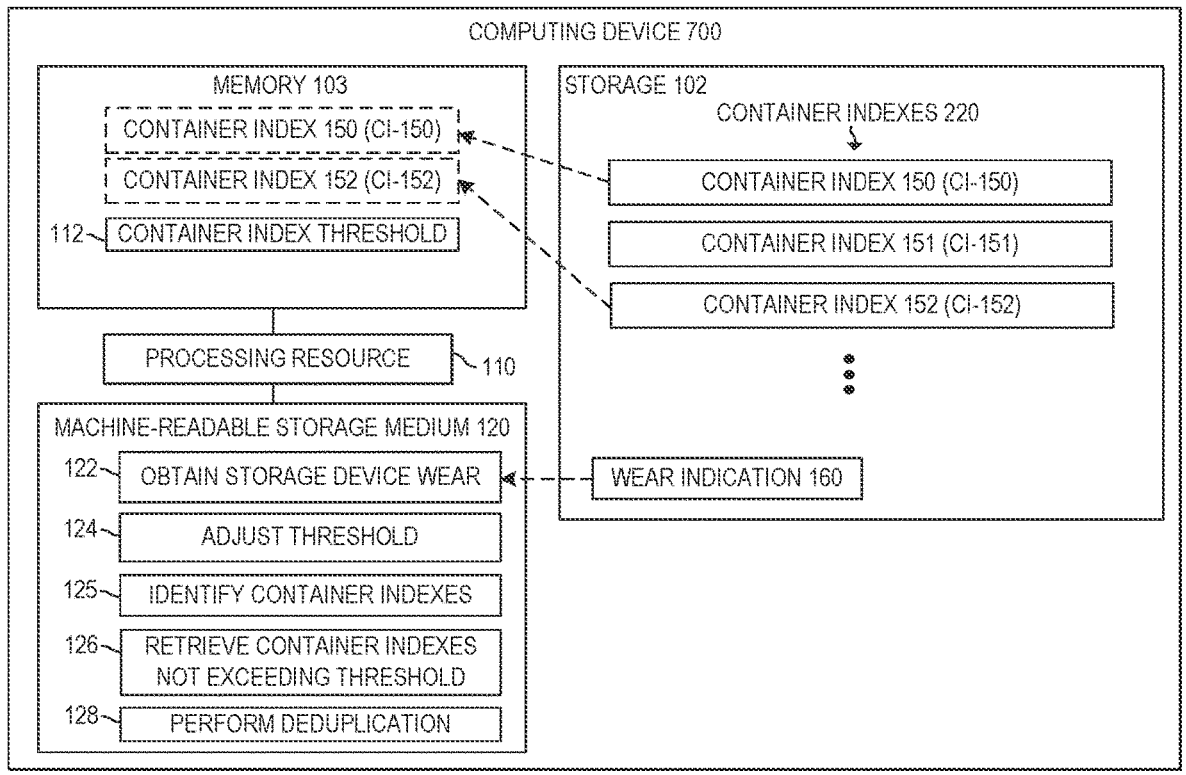
FIG. 7 is a block diagram of an example deduplication system to obtain an indication of an amount of storage device wear and FIG. 8 is a flowchart of an example method that includes adjusting a compaction threshold.
Figure 8:
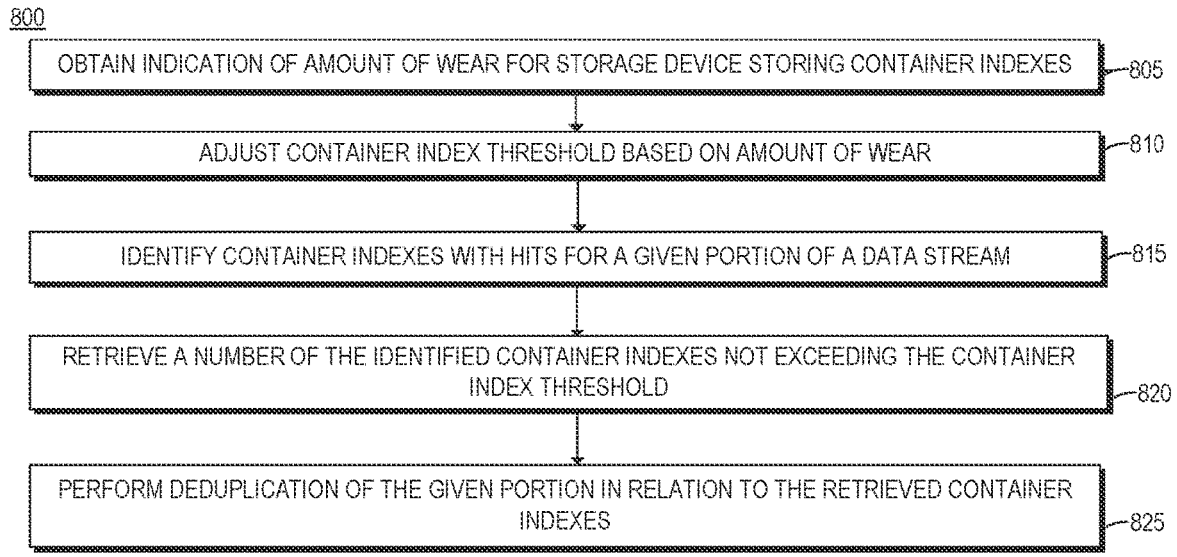

Examples are described below in relation to FIGS. 7 and 8, in which FIG. 7 is a block diagram of an example computing device 700 to obtain an indication of an amount of storage device wear, and FIG. 8 is a flowchart of an example method 800 that includes adjusting a container index threshold.

In the example of FIG. 7, computing device 700 may comprise at least one processing resource 110 and at least one machine-readable storage medium 120, as described above in relation to FIG. 1. Storage medium 120 may comprise instructions executable by processing resource(s) 110 to implement functionalities of computing device 700 described herein, the instructions including instructions 122, 124, 125, 126, 128, and 129 described above in relation to FIGS. 1 and 4. Computing device 500 also comprises memory 103 (comprising thresholds 112 and 114) and storage 102 (comprising container indexes 220), as described above in relation to FIG. 1. Although execution of method 800 is described below with reference to computing device 700 of FIG. 7, other computing devices or systems suitable for the execution of method 800 may be utilized (e.g., deduplication system 100 of FIG. 1, or deduplication system 400 of FIG. 4, etc.). Additionally, implementation of method 800 is not limited to such examples.

At 805 of method 800, instructions 122 may obtain an indication of an amount of wear 160 experienced by at least one storage device of storage 102 storing container indexes 220 of a deduplication system (e.g., implemented by computing device 700). At 810, instructions 124 may adjust container index threshold 112 based on the amount of wear 160, as described above. At 815, instructions 125 may identify, among container indexes 220, container indexes having hits for a given portion of a given data stream.

At 820, instructions 126 may retrieve, from the at least one storage device of storage 102 to memory 103 (as shown in FIG. 7), a number of the identified container indexes, the number not exceeding container index threshold 112, wherein the container index threshold is a maximum number of identified container indexes that may be read from the at least one storage device (of storage 102) for deduplication of a single portion of any data stream. At 825, instructions 128 may perform deduplication of the given portion in relation to the retrieved container indexes.

All of the features disclosed in this specification (including any accompanying claims, abstract and drawings), and/or all of the elements of any method or process so disclosed, may be combined in any combination, except combinations where at least some of such features and/or elements are mutually exclusive. For example, functionalities described herein in relation to any of FIGS. 1-8 may be provided in combination with functionalities described herein in relation to any other of FIGS. 1-8. For example, a computing device or deduplication system, in accordance with example described herein, may implement any combination of: setting a container index threshold value based on a storage device type (e.g., as described in relation to FIG. 5), setting a compaction threshold value based on a storage device type (e.g., as described in relation to FIG. 6), adjusting a container index threshold based on an amount of wear (e.g., as described in relation to FIGS. 1 and 2), adjusting a compaction threshold based on an amount of wear (e.g., as described in relation to FIGS. 3 and 4), pinning container index entries as described above, and pre-seeding data as described above.

Although each of the various flowcharts included and described herein shows a specific order of performance of certain functionalities, the respective methods represented by those flowcharts are not limited to that order. For example, functionalities shown in succession in any flowchart may be performed in a different order, may be executed concurrently or with partial concurrence, or a combination thereof. In examples described herein, the phrase "based on" is not exclusive and should not be read as "based exclusively on". Rather, the phrase "based on" as used herein is inclusive and means the same as the alternative phrasing "based at least on" or "based at least in part on". As such, any determination, decision, comparison, or the like, described herein as "based on" a certain condition, data, or the like, may be understood to mean that the decision, comparison, or the like, is based at least on (or based at least in part on) that condition, data, or the like, and may also be based on other condition(s), data, or the like. In examples described herein, functionalities described as being performed by "instructions" may be understood as functionalities that may be performed by those instructions when executed by a processing resource. In other examples, functionalities described in relation to instructions may be implemented by one or more engines, which may be any combination of hardware and programming to implement the functionalities of the engine(s).

As used herein, a "computing device" may be a server, storage device, storage array, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated herein, a storage medium 120 may be implemented by one machine-readable storage medium, or multiple machine-readable storage media.

In examples described herein, a storage array may be a computing device comprising a plurality of storage devices and one or more controllers to interact with host devices and control access to the storage devices. In some examples, the storage devices may include HDDs, SSDs, or any other suitable type of storage device, or any combination thereof. In some examples, the controller(s) may virtualize the storage capacity provided by the storage devices to enable a host to access a virtual object (e.g., a volume) made up of storage space from multiple different storage devices.

In some examples, the functionalities described above in relation to instructions described herein may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein.

What is claimed is:

1. An article comprising at least one non-transitory machine-readable storage medium comprising instructions executable by at least one processing resource of a deduplication system to:
   determine whether a hardware storage target for container indexes for the deduplication system comprises one or more storage devices of a first type or one or more storage devices of a second type, wherein storage devices of the second type have a lesser operational life for write operations than storage devices of the first type;
   in response to a determination that the deduplication system is to store container indexes on one or more storage devices of a first type, set a container index threshold to a first value;
   in response to a determination that the deduplication system is to store container indexes on one or more storage devices of the second type, set the container index threshold to a second value higher than the first value;
   store a plurality of container indexes on the hardware storage target;
   identify, among the plurality of container indexes, container indexes having hits for a given portion of a given data stream;
   retrieve, from the hardware storage target, a number of the container indexes having hits, the number not exceeding the container index threshold, wherein the container index threshold is a maximum number of container indexes having hits to be read from the hardware storage target for deduplication of a single portion of any data stream; and
   perform deduplication of the given portion in relation to the retrieved container indexes.

2. The article of claim 1, wherein:
   the one or more storage devices of the first type are one or more hard disk drives (HDDs); and
   the one or more storage devices of the second type are one or more solid-state drives (SSDs).

3. The article of claim 1, wherein the instructions are executable to:
   when the deduplication system is to store container indexes on one or more storage devices of the second type:
      increase the container index threshold above the second value based on an indication that the one or more storage devices of the second type have experienced at least a threshold amount of wear.

4. The article of claim 1, wherein the instructions are executable to:
   in response to a determination that the deduplication system is to store container indexes on one or more storage devices of a first type, set a compaction threshold to a first compaction value;
   in response to a determination that the deduplication system is to store container indexes on one or more storage devices of the second type, set the compaction threshold to a second compaction value higher than the first compaction value, wherein each of the container indexes comprises one or more entries each including a respective reference count;
   perform compaction on a selected one of the container indexes having a number of unreferenced entries that is greater than or equal to the compaction threshold; and
   prevent compaction of any of the container indexes having a number of unreferenced entries that is less than the compaction threshold;
   wherein, for each of the entries of each of the container indexes, the reference count of the entry indicates whether the entry is unreferenced.

5. The article of claim 4, wherein performance of the compaction comprises writing the selected container index to a different location without the unreferenced entries.

6. The article of claim 1, wherein the instructions are executable to, when the deduplication system is to store container indexes on one or more storage devices of the second type:
   obtain an indication of an amount of wear experienced by at least one of the storage devices of the second type storing the plurality of container indexes; and
   adjust the container index threshold based on the amount of wear.

7. The article of claim 6, wherein the instructions to adjust the container index threshold comprise instructions executable to:
   successively increase the container index threshold as the amount of wear for the at least one storage device of the second type increases.

8. The article of claim 7, wherein the instructions to successively increase the container index threshold comprise instructions executable to:
   increase the container index threshold each time the amount of wear is determined to have exceeded a next boundary of a plurality of successively greater wear level boundaries.

9. The article of claim 6, wherein the amount of wear is represented by an estimate of an amount of life left for the at least one storage device of the second type.

10. The article of claim 6, wherein:
    the deduplication system comprises a plurality of containers, each comprising one or more chunks of data;

each of the container indexes is an index of a respective one of a plurality of containers;
each of the container indexes comprises one or more entries, each for a respective chunk of the respective container for which the container index is an index, and each entry for a respective chunk comprising:
a chunk signature for the respective chunk; and
a reference count for the chunk signature.

11. The article of claim 10, wherein the instructions to identify the container indexes having hits for the given portion comprise instructions to:
compare selected chunk signatures of the given portion of the given data stream to a sparse index mapping chunk signatures to container indexes of the plurality of container indexes; and
identifying, among the plurality of container indexes, container indexes having hits for the given portion based on the selected chunk signatures present in the sparse index.

12. The article of claim 11, wherein:
the sparse index maps each chunk signature in the sparse index to an identifier of one of the plurality of container indexes having an entry including the chunk signature; and
the instructions to identify the container indexes having hits for the given portion comprise instructions to identify, as container indexes having hits, each of the container indexes having an identifier to which a given one of the selected chunk signatures is mapped in the sparse index.

13. The article of claim 10, wherein the instructions comprise instructions to:
in response to a determination that the amount of wear experienced by the at least one storage device of the second type has exceeded a pinning threshold:
for each entry of each container index, when the reference count reaches a count threshold, designate that reference count as immutable such that it is not changed while designated as immutable.

14. The article of claim 6, wherein the instructions are executable to, when the deduplication system is to store container indexes on one or more storage devices of the second type:
adjust a compaction threshold based on the amount of wear;
perform compaction on a selected one of the container indexes having a number of unreferenced entries that is greater than or equal to the compaction threshold; and
prevent compaction of any of the container indexes having a number of unreferenced entries that is less than the compaction threshold;
wherein, for each of the entries of each of the container indexes, the reference count of the entry indicates whether the entry is unreferenced.

15. A deduplication system comprising:
at least one processing resource; and
at least one non-transitory machine-readable storage medium comprising instructions executable by at least one processing resource to:
determine whether a hardware storage target for container indexes for the deduplication system comprises one or more storage devices of a first type or one or more storage devices of a second type, wherein storage devices of the second type have a lesser operational life for write operations than storage devices of the first type;
in response to a determination that the deduplication system is to store container indexes on one or more storage devices of a first type, set a container index threshold to a first value;
in response to a determination that the deduplication system is to store container indexes on one or more storage devices of the second type, set the container index threshold to a second value higher than the first value;
store a plurality of container indexes on the hardware storage target;
identify, among the plurality of container indexes, container indexes having hits for a given portion of a given data stream; and
retrieve, from the hardware storage target, a number of the container indexes having hits, the number not exceeding the container index threshold, wherein the container index threshold is a maximum number of container indexes having hits to be read from the hardware storage target for deduplication of a single portion of any data stream; and
perform deduplication of the given portion in relation to the retrieved container indexes.

16. The deduplication system of claim 15, wherein:
the one or more storage devices of the first type are one or more hard disk drives (HDDs); and
the one or more storage devices of the second type are one or more solid-state drives (SSDs).

17. The deduplication system of claim 15, wherein the instructions are executable to, when the deduplication system is to store container indexes on one or more storage devices of the second type:
obtain an indication of an amount of wear experienced by at least one of the storage devices of the second type storing the plurality of container indexes; and
increase the container index threshold above the second value based on the amount of wear experienced being at least a threshold amount of wear.

18. A method of a deduplication system, the method comprising:
determining whether a hardware storage target for container indexes for the deduplication system comprises one or more storage devices of a first type or one or more storage devices of a second type, wherein storage devices of the second type have a lesser operational life for write operations than storage devices of the first type;
in response to a determination that the deduplication system is to store container indexes on one or more storage devices of the second type, setting the container index threshold to a second value higher than a first value to which the deduplication system is to set the container index threshold when the deduplication is to store container indexes on one or more storage devices of the first type;
storing a plurality of container indexes on the hardware storage target;
identifying, among the plurality of container indexes, container indexes having hits for a given portion of a given data stream;
retrieving, from the hardware storage target, a number of the container indexes having hits, the number not exceeding the container index threshold, wherein the container index threshold is a maximum number of container indexes having hits to be read from the hardware storage target for deduplication of a single portion of any data stream; and performing deduplication of the given portion in relation to the retrieved container indexes.

19. The method of claim 18, wherein:

the one or more storage devices of the first type are one or more hard disk drives (HDDs); and the one or more storage devices of the second type are one or more solid-state drives (SSDs).

20. The method of claim 18, further comprising:

obtaining an indication of an amount of wear experienced by at least one of the storage devices of the second type storing the plurality of container indexes; and increasing the container index threshold above the second value based on the amount of wear experienced being at least a threshold amount of wear.

* * * * *